United States Patent [19]

Belsan et al.

[11] Patent Number: 5,371,850
[45] Date of Patent: Dec. 6, 1994

[54] INTERPROCESS MESSAGE QUEUE

[75] Inventors: Jay S. Belsan, Nederland; Robert C. Lynn, Louisville; Bruce A. Mork, Westminster, all of Colo.

[73] Assignee: Storage Technology Corporation, Louisville, Colo.

[21] Appl. No.: 870,819

[22] Filed: Apr. 20, 1992

[51] Int. Cl.5 ............................................. G06F 13/00
[52] U.S. Cl. ..................................... 395/200; 395/650
[58] Field of Search ........................ 395/200, 650, 725

[56] References Cited

U.S. PATENT DOCUMENTS 5,179,708  1/1993  Gyllstrom et al. .................. 395/725

Primary Examiner—Robert L. Richardson
Attorney, Agent, or Firm—Duft, Graziano & Forest

[57] ABSTRACT

The interprocess message queue operates in a multiprocessing environment to ensure that interprocess messages sent from an originating task do not overflow the destination task resource pipe. To prevent message overflow, the destination task creates a message queue when a communication session is originated and populates this message queue with n message reserved for the originating task. Each time the originating task wishes to send a message to the destination task, the originating task first retrieves one of the reserved messages from the destination task message queue. Once the message is retrieved from the message queue, the originating task is assured that memory space is available in the resource pipe to send a message. When the destination task receives the message, the destination task reads the message and flags the message as old, thereby allowing another message to be sent, since the originating task can now remove this old message from the message queue to make room for a new message. In this way, the destination task resource pipe never overflows.

19 Claims, 3 Drawing Sheets

INTERPROCESS MESSAGE QUEUE

FIELD OF THE INVENTION

This invention relates to interprocess communication systems and, in particular, to an interprocess message queue that eliminates blocking in the transmission of interprocess messages.

PROBLEM

It is a problem in the field of interprocess communications to transmit messages among a plurality of concurrently operational processes without encountering blocking or message queue overflow. Interprocess communication requires the careful management of the message transmissions between processes, especially when the communications traverse the boundaries between processors and over a multiprocessor bus. There are numerous bus contention, collision avoidance, and message recovery arrangements in the prior art that address the problems of interprocess communication. A limitation of all of these arrangements is that none of them effectively avoids message blocking without implementing an interprocess hand shaking protocol that significantly negatively impacts message throughput. Therefore, it is a significant problem in interprocess communication to maximize the message transfer efficiency while also avoiding the problem of message blocking.

SOLUTION

The above described problems are solved and a technical advance achieved in the field by the interprocess message queue of the present invention that operates in a multiprocessing environment to ensure that interprocess messages sent from an originating task do not overflow the destination task resource pipe. To prevent message overflow, the destination task creates a message queue in a resource pipe when an interprocess communication session is originated and populates this message queue with n messages reserved for the originating task. Each time the originating task wishes to send a message to the destination task, the originating task first retrieves one of the reserved messages from the message queue in the destination task resource pipe. Once the message is retrieved from the message queue, the originating task is assured that memory space is available in the resource pipe to send a message. When the destination task receives the message, it is stored in the message queue for this communication session. The destination task later reads the message from the message queue and flags the message as old, thereby allowing another message to be sent, since the originating task can now remove this old message from the message queue to make room for a new message. In this way, the destination task resource pipe never overflows. If the originating task transmits messages faster than the destination task can operate on them, the message queue for this communication session fills with new messages and, when the originating task attempts to remove an old message therefrom, this request is not executed by the kernel, thereby throttling message traffic.

This interprocess message queue avoids the message blocking problem of the prior art by reserving message slots in a message queue to ensure that each originating process has sufficient message space to exchange messages with the destination task to thereby eliminate the possibility of message blocking. The use of the message queue improves the efficiency of the interprocess message exchange by avoiding the necessity of having to hand shake between processes on a message-by-message basis. A further efficiency is obtained since the destination task is not required to participate in the message transmission or message queue management. The destination task is generally a resource shared by a number of processes and a reduction in the number of operations that must be performed by the destination task significantly improves system performance.

DETAILED DESCRIPTION

Figure 1:
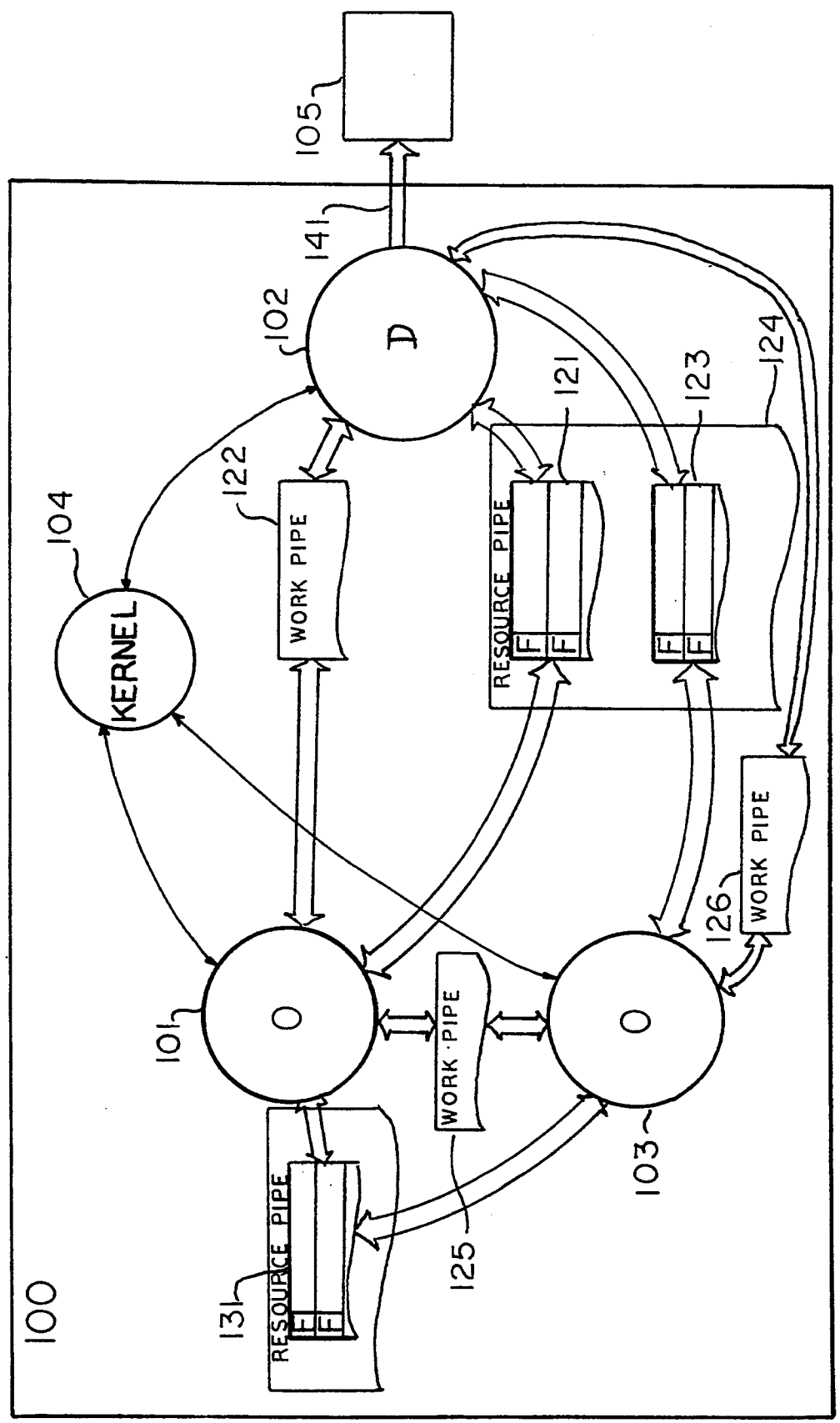
FIG. 1 illustrates in block diagram form a typical interprocess communication environment.

FIG. 1 illustrates in block diagram form the overall architecture of the interprocess communication structure in a computer system 100 that implements the interprocess message queue of the present invention. This architecture is illustrated within a single processor computer system 100 although it is obvious that the concepts of the present invention are applicable to the use of multiple processors in a multiprocessor computer system configuration. The computer system 100 includes a processing element that maintains a plurality of concurrently operational processes 101-103 extant thereon. These processes 101-103 are computational tasks 101, 103 or device driver tasks 102 that function under the control of program instructions and kernel 104 as is well understood in the data processing art.

In this data processing environment, the computer system 100 is typically equipped with a limited number of resources 102, each of which is accessible via a kernel 104 to the plurality of processes 101, 103 that are implemented on the computer system 100. Therefore, a number of the processes on the computer system 100 are resource controlling processes 102, such as a print driver process 102 for a peripheral printer device 105, that functions to receive data from other processes 101, 103 for outputting via the printer device 105 that is attached to the computer system 100 via leads 141. A print driver process 102 manages the interface between a process 101, 103 that generates the data to be printed and the peripheral device 105 that performs the printing operation. Therefore, in the context of the computer system 100, the print driver process 102 is a resource that can be accessed by a number of the other processes 101, 103 on the computer system 100 and is limited in that it interfaces with a single physical device 105 that may be simultaneously requested by a plurality of the processes 101, 103 operational on the computer system 100. The example of a print driver process is simply used to illustrate the concept of an interprocess message queue and should not be viewed as any limitation on the generic concept of interprocess communication.

Management of the flow of data to a limited resource represents a significant performance issue in the computer system 100 since a process can be forced into a wait state until the limited resource that it is attempting to access is available for communication therewith. It is advantageous to manage the flow of data between the processes in a manner that prevents the occurrence of blocking and also provides access to resources in an equitable manner. To accomplish this, the computer system 100 provides an interprocess communication arrangement that enables processes to communicate in an orderly manner to minimize the possibility of blocking in the transmission of messages between processes. The computer system 100 uses an interprocess message queue 121 that is created by a destination process 102 in resource pipe 124 when it is a target of an interprocess communication session with another (originating) process 101 on the computer system 100. The destination process 102 creates the interprocess message queue 121 and reserves a predetermined number (n) of message slots therein to receive messages from the originating process 101. Whenever the originating process 101 creates a message for transmission to the destination process 102, the originating process 101 first retrieves a message from the interprocess message queue 121 dedicated to this communication session to thereby make room for the message that has just been created. Once a message slot has been made available in the destination process 102 interprocess message queue 121, the originating process 101 can then transmit its message knowing that it will be received and stored in the interprocess message queue 121 without blocking since the availability of space thereon is controlled by the originating process 101 not the destination process 102.

Interprocess Message Flow

Figure 2:
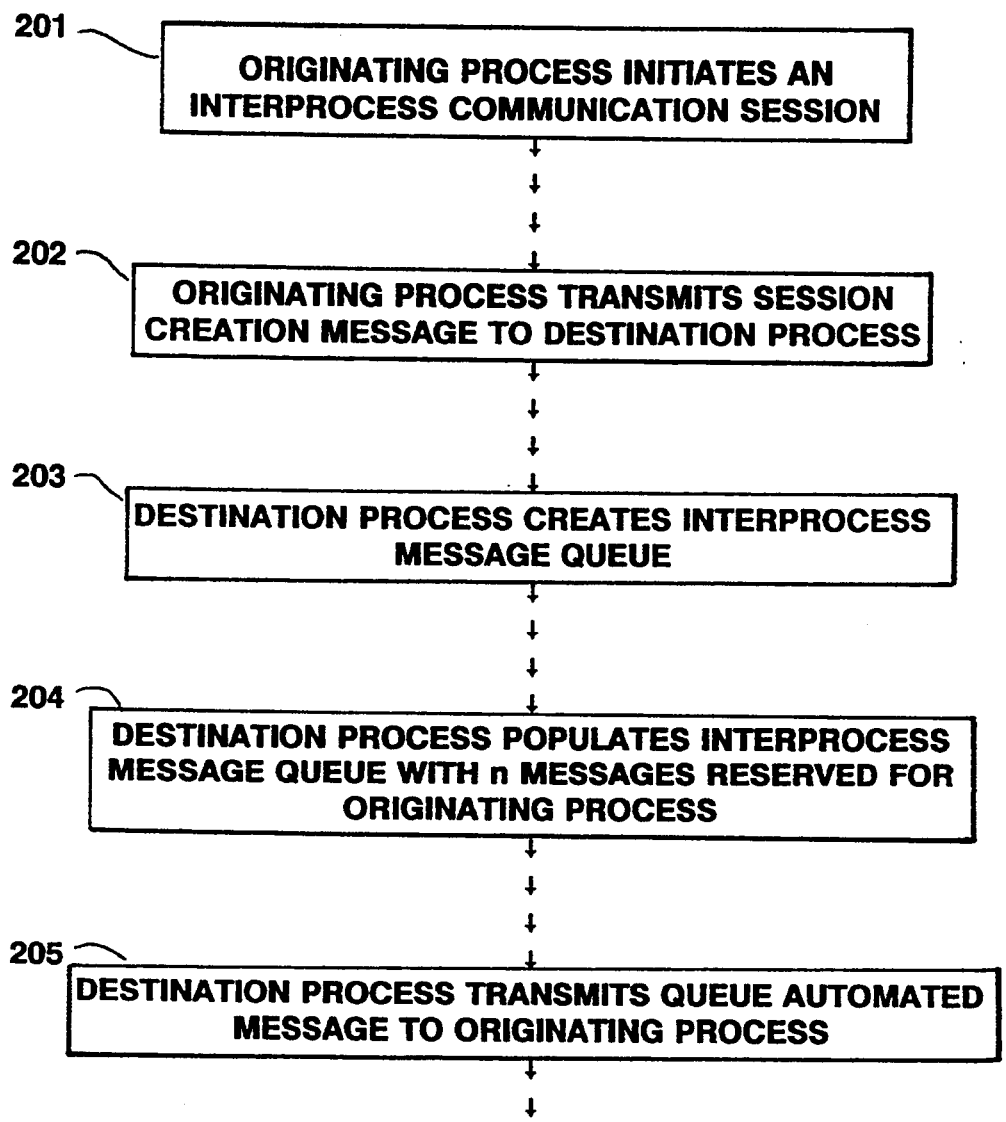
FIGS. 2 and 3 illustrate in flow diagram form the operation and management of the message queues of the present invention.
Figure 3:
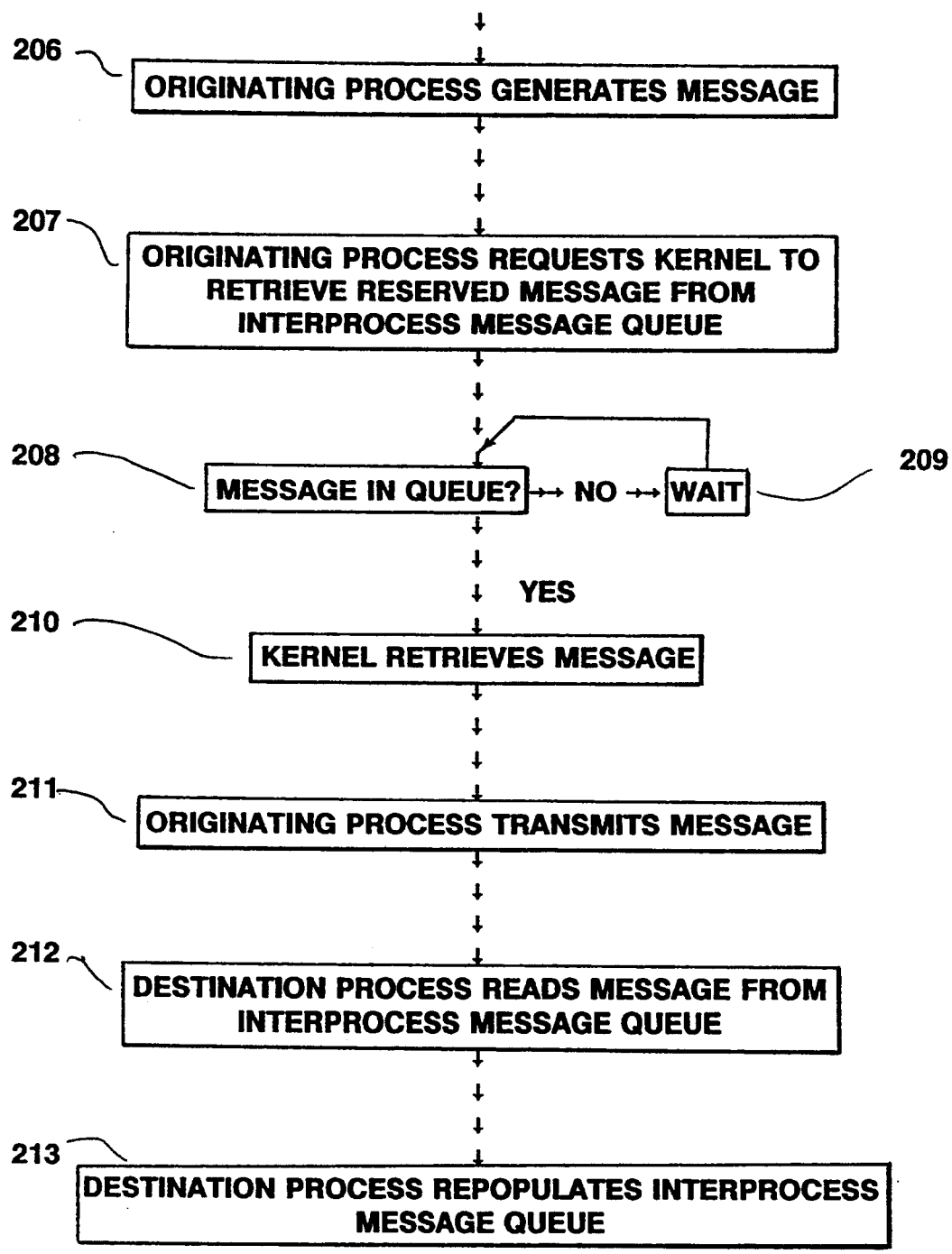

A specific example of this concept is the use of a print driver process 102 that can receive input from a plurality of print creation processes 101, 103 that are concurrently operational on the computer system 100. Whenever a print creation process 101 enters the output mode, it initiates a communication session, shown on FIG. 2 as step 201 with the print driver process 102 which is the destination process in this message exchange. The print driver process 102 is a resource and communicates with the print creation processes 101, 103 by means of message queues 121, 123, respectively, that are unidirectional communication paths from the print creation processes 101, 103 to the print driver process 102 as well as work pipes 122, 126 which are bidirectional communication paths between the print creation processes 101, 103 and the print driver process 102 for exchanging control signals therebetween. Therefore, when a print creation process 101 initiates an output operation, it transmits a message via the kernel 104 at step 202 to the print driver process 102 via the work pipe 122, to initiate the data communication session between these two processes 101, 102.

In response to the receipt of an output request from the print creation process 101, the print driver process 102 creates at step 203 an interprocess message queue 121 that is dedicated to use by the print creation process 101 that has requested an output. Once the print driver process 102 creates the interprocess message queue 121, it populates the message queue at step 204 with a plurality (n) of messages, which can be null statements, that are used to occupy the interprocess message queue 121 and are later retrieved by the print creation process 101 as described below. Once the interprocess message queue 121 is populated with the predetermined number of messages, the print driver process 102 generates a queue available message at step 205 and transmits this message to the print creation process 101 via the work pipe 122 and kernel 104 to identify the existence of the interprocess message queue 121 as well as to note the number of message slots (n) available therein for use by the print creation process 101. The kernel 104 in the computer system 100 forwards this queue available message to the print creation process 101 to thereby enable it to begin outputting data to the print driver process 102.

Multiple Queues

In operation, the print driver process 102 can have a number of interprocess message queues 121, 123 created, each of which receives an input from a separate print creation process 101, 103 or possibly have multiple interprocess message queues for a single print creation process with one interprocess message queue for each print job that is created by the print creation process. The multiple interprocess message queues 121, 123 can be located in physically separate regions of the computer system memory or can simply be implemented as singly linked lists that occupy available memory space in the computer system memory. The print driver process 102 services the plurality of interprocess message queues 121, 123 on a priority basis to perform the tasks identified by the messages contained therein.

Message Transmission

Print creation process 101 generates a message for destination task 102 at step 206. The print creation process 101 inserts this message into the interprocess message queue 121 by first retrieving a message therefrom by transmitting control signals at step 207 to the kernel 104 requesting that a message be taken out of the interprocess message queue 121. Since the interprocess message queue 121 was first populated with null messages addressed to print creation process 101, kernel 104 at step 208 determines whether one of these messages are still in interprocess message queue 121. If a message is available for retrieval, the kernel 104 at step 210 retrieves one of these messages from the interprocess message queue 121 thereby freeing up a message storage location in this interprocess message queue 121, which storage location is reserved for the use by the print creation process 101. Once the space has been made available in the interprocess message queue 121 in this manner, the print creation process 101 transmits at step 211 a data message via the kernel 104 to this memory location in the interprocess message queue 121 that is reserved for the print creation process 101. The kernel 104 loads this message into the interprocess message queue 121 in the available memory location and then proceeds with processing other tasks.

The print driver process 102 can retrieve the newly deposited message at step 212 as a function of the priority of this message and the other tasks previously queued in the print driver process interprocess message queue 121. Print driver process 102 repopulates interprocess message queue 121 with a new message each time it removes a message from interprocess message queue 121. The message repopulation can be accomplished in a number of ways. A flag bit (F) can be associated with each message in the interprocess message queue 121 to identify at step 213 which of these messages have been retrieved by the print driver process 102 in order to prevent the originating process 101 from overwriting its earlier transmitted messages that have not yet been acted on by the destination process 102. Alternatively, the retrieved message can be replaced with a null message. When the kernel 104 receives a request from an originating process 101 to retrieve a message from the interprocess message queue 121 in a destination process 102 and this interprocess message queue 121 is full of unretrieved messages, the kernel 104 at step 208 simply does not act on the request from the originating process 101, thereby blocking further transmissions from the originating process 101. This mechanism automatically throttles the data output of the originating process 101 rather than at the destination process 102 where the message could be lost. This arrangement is self limiting in that messages are not transmitted until there is a memory location available to receive the message and memory space allocated for the storage of this message at the destination process 102.

Multiple Process States

An originating process 101 can itself also concurrently be a destination process in an interprocess communication with another originating process 103. Therefore, in the example described above, the first originating process 101 initiates the interprocess communication with a second or destination process 102. The second process 102 establishes the interprocess communication queue 121 to be able to receive messages from the or first process 101. In addition, a third process 103 can initiate an interprocess communication via work pipe 125 as the originating process with regard to the first process 101, which in this communication interaction would become the destination process. Therefore, the first process 101 itself would establish an interprocess message queue 131 for use by the third process 103, as described above. Therefore, the first process 101 is an originating process with regard to the second process 102 while it is also a destination process with regard to the third process 103.

The prereservation of a predetermined number of message slots in the interprocess message queue 121, 123, 131 permits the initiation of interprocess communication without the need to reserve an unlimited amount of memory space to handle these messages since for each interprocess communication session that is initiated, only a limited number of the predetermined message slots are created by the destination process. There is a finite number of message slots in existence in the computer system 100 at any one time. This number of active message slots is easily determined by multiplying the number of active interprocess communications by the predetermined number of message slots per interprocess message queue that is active. The processes 101-103 that are active on the computer system 100 as noted above can also intercommunicate via work pipes 122, 125, 126 which are bidirectional communication paths managed by the kernel 104 to exchange control messages therebetween. The interprocess message queue is primarily intended as a resource pipe to handle unidirectional communications from an originating process 101 to the destination or resource process 102 without requiring responses thereto by the destination process 102. This architecture provides a more equitable distribution of the workload since the resource process 102 tends to be the bottleneck in the computer system 100 and requiring it to acknowledge the receipt of every transmission from an originating process 101 provides an additional work burden that is unnecessary in view of the interprocess communication scheme described above. Thus, the resource process 102 does not need to respond to the transmission of a message via the interprocess message queue 121 but simply acts on these messages asynchronously with the transmission thereof. The kernel 104 simply empties a location in the interprocess message queue 121 every time an originating process 101 creates a message for transmission to the resource process 102. No response acknowledgement must be provided to the originating process 101 since the kernel 104 does not permit the transmission of a message to the resource process 102 unless a message storage location has previously been made available by the kernel 104 removing one of the previously processed messages from the interprocess message queue 121 for this communication interaction. This scheme implements a default acknowledgement arrangement and the originating process 101 can presume the message has been received by the resource process 102 once the kernel 104 accepts the transmission from the originating process 101.

While a specific embodiment of this invention has been disclosed, it is expected that those skilled in the art can and will design alternate embodiments of this invention that fall within the scope of the appended claims.

We claim:

1. In a computer system that has extant thereon a plurality of processes, a method of managing interprocess communication between a first process of said plurality of processes and a second process of said plurality of processes, wherein said second process includes an interprocess message queue containing a plurality of messages reserved for said first process, comprising the steps of:

retrieving, in response to the creation by said first process of a message destined for said second process, one of said plurality of messages, reserved for said first process, from said interprocess message queue in said second process; and transmitting said message created by said first process to said second process interprocess message queue to replace said retrieved one message.

2. The method of claim 1 further comprising the step of:

establishing in said first process, in response to a third process of said plurality of processes initiating a communication with said first process, an interprocess message queue reserved for said third process.

3. The method of claim 2 further comprising the step of:

populating said interprocess message queue reserved for said third process with a predetermined number of messages for said third process.

4. The method of claim 2 further comprising the step of:

transmitting a message to said third process indicating the extent of said interprocess message queue.

5. The method of claim 1 wherein said interprocess message queue comprises a resource pipe for unidirectional communication from said first process to said second process.

6. The method of claim 5 wherein said first process and said second process bidirectionally communicate via a work interprocess communication pipe independent of said interprocess message queue.

7. The method of claim 1 further comprising the step of:

repopulating said interprocess message queue with a message reserved for said first process for each of said messages, transmitted by said first process to said second process interprocess message queue to replace said retrieved one message, that is removed from said interprocess message queue by said second process.

8. The method of claim 1 further comprising the step of:
   inhibiting said step of retrieving a message reserved for said first process from said interprocess message queue in the absence of a said message reserved for said first process therein.

9. In a computer system that has extant thereon a plurality of processes, a method of managing interprocess communication among the plurality of processes comprising the steps of:
   establishing, in response to a first process of said plurality of processes initiating a communication with a second process of said plurality of processes, in said second process an interprocess message queue containing a plurality of messages reserved for said first process;
   retrieving, in response to the creation by said first process of a message destined for said second process, one of said plurality of messages from said interprocess message queue in said second process; and
   transmitting said message created by said first process to said second process interprocess message queue to replace said retrieved one message.

10. The method of claim 9 wherein said step of establishing includes:
    populating said interprocess message queue reserved for said first process with a predetermined number of messages for said first process.

11. The method of claim 10 wherein said step of establishing includes:
    transmitting a message to said first process indicating the extent of said interprocess message queue.

12. The method of claim 9 further comprising the step of:
    transmitting a message to said first process indicating the extent of said interprocess message queue.

13. The method of claim 9 wherein said interprocess message queue is a resource pipe for unidirectional communication from said first process to said second process.

14. The method of claim 13 wherein said first process and said second process bidirectionally communicate via a work interprocess communication pipe independent of said interprocess message queue.

15. The method of claim 9 further comprising the step of:
    repopulating said interprocess message queue with a message reserved for said first process for each of said messages, transmitted by said first process to said second process interprocess message queue to replace said retrieved one message, that is removed from said interprocess message queue by said second process.

16. The method of claim 9 further comprising the step of:
    inhibiting said step of retrieving a message reserved for said first process from said interprocess message queue in the absence of a said message reserved for said first process therein.

17. The method of claim 9 further comprising the step of:
    establishing in said first process, in response to a third process of said plurality of processes initiating a communication with said first process, an interprocess message queue reserved for said third process.

18. The method of claim 17 wherein said step of establishing in said first process includes:
    populating said interprocess message queue reserved for said third process with a predetermined number of messages for said third process.

19. The method of claim 18 wherein said step of establishing includes:
    transmitting a message to said third process indicating the extent of said interprocess message queue.

* * * * *